(12) United States Patent
Salyer

(10) Patent No.: US 10,479,284 B1
(45) Date of Patent: Nov. 19, 2019

(54) LOAD-BEARING SYSTEM FOR SUPPORTING CARGO FROM A VEHICLE

(71) Applicant: Jimmy Ross Salyer, Visalia, CA (US)

(72) Inventor: Jimmy Ross Salyer, Visalia, CA (US)

(*) Notice: Subject to any disclaimer, the term of this patent is extended or adjusted under 35 U.S.C. 154(b) by 0 days.

(21) Appl. No.: 16/119,694

(22) Filed: Aug. 31, 2018

(51) Int. Cl.
*B60R 9/06* (2006.01)
*B62D 43/02* (2006.01)
*B60R 9/10* (2006.01)

(52) U.S. Cl.
CPC ............. *B60R 9/06* (2013.01); *B60R 9/10* (2013.01); *B62D 43/02* (2013.01)

(58) Field of Classification Search
CPC .............. B60R 9/06; B60R 9/10; B62D 43/02
USPC .......................................... 224/502, 509, 510
See application file for complete search history.

(56) References Cited

U.S. PATENT DOCUMENTS

| | | | | |
|---|---|---|---|---|
| 5,518,159 A | * | 5/1996 | DeGuevara | B60R 9/06 224/282 |
| 5,527,146 A | * | 6/1996 | Allsop | B60R 9/06 224/319 |
| 5,544,799 A | * | 8/1996 | Didlake | B60R 9/06 224/282 |
| 5,664,717 A | * | 9/1997 | Joder | B60R 9/06 224/502 |
| 5,685,686 A | * | 11/1997 | Burns | B60R 9/06 224/282 |
| 5,845,832 A | * | 12/1998 | Eichmann | B60R 9/06 224/509 |
| 5,884,826 A | * | 3/1999 | Shaver | B60R 9/06 211/195 |
| 6,085,954 A | * | 7/2000 | Bloemer | B60R 9/06 224/502 |
| 6,123,498 A | * | 9/2000 | Surkin | B60R 9/06 224/509 |
| 6,164,508 A | * | 12/2000 | van Veenen | B60R 9/06 224/502 |
| 6,189,748 B1 | * | 2/2001 | Hutter | B62D 43/00 224/42.21 |
| 6,199,735 B1 | * | 3/2001 | Cothern | B60R 9/06 224/509 |
| 6,701,913 B1 | | 3/2004 | LeDuc | |
| D538,206 S | * | 3/2007 | Yaggi, Sr. | D12/162 |
| 7,261,229 B1 | * | 8/2007 | Allen | B60R 9/06 224/495 |

(Continued)

*Primary Examiner* — Nathan J Newhouse
*Assistant Examiner* — Lester L Vanterpool
(74) *Attorney, Agent, or Firm* — Plager Schack LLP

(57) ABSTRACT

A load-bearing system configured to rotatably support heavy cargo loads supported from a vehicle is provided. The system includes a pivot platform coupled to the vehicle and having first and second swing arms pivotably mounted to the pivot platform, each swing arm having a first end coupled to the pivot platform and a second end coupled to a mounting platform, the mounting platform rotatably mounted to the second ends of the first and second swing arms and designed to permit attachment thereto of one or more cargo carriers to support cargo, and a locking assembly coupled to the vehicle. The locking assembly pivotably adjusts to a first position to lock the mounting platform into a first position against the vehicle. The locking assembly pivotably adjusts to a second position to unlock the mounting platform and permit rotation of the mounting platform away from the vehicle.

10 Claims, 4 Drawing Sheets

(56) References Cited

U.S. PATENT DOCUMENTS

| | | | | |
|---|---|---|---|---|
| 7,631,791 B1* | 12/2009 | Allen | ................ | B60R 9/10 |
| | | | | 224/503 |
| 10,328,862 B2* | 6/2019 | Eichmann | ................ | B60R 9/06 |
| 2002/0020728 A1* | 2/2002 | Chimenti | ................ | B60R 9/06 |
| | | | | 224/509 |
| 2006/0273125 A1* | 12/2006 | Bogoslofski | ................ | B60R 9/06 |
| | | | | 224/509 |
| 2012/0305612 A1 | 12/2012 | Bell | | |

* cited by examiner

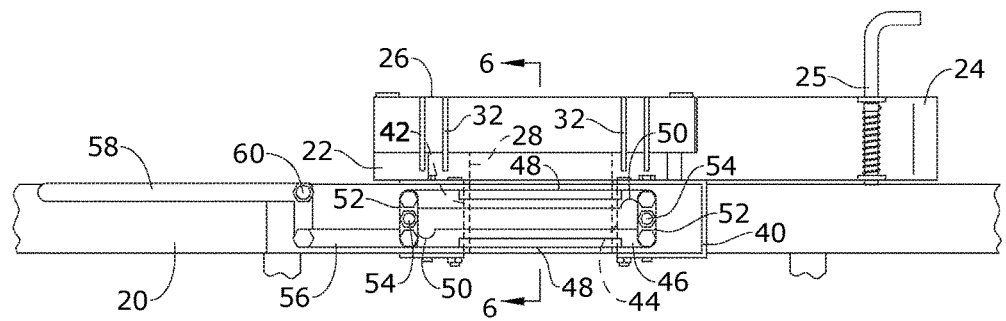
FIG.5
FIG.6
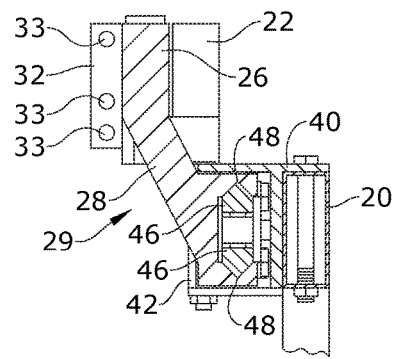
FIG.7
FIG.8
FIG.9

LOAD-BEARING SYSTEM FOR SUPPORTING CARGO FROM A VEHICLE

BACKGROUND

The embodiments herein relate generally to cargo carriers that are attached to the rear end of a vehicle. More specifically, embodiments of the invention are directed to a load-bearing system for rotatably supporting heavy cargo supported by a vehicle, which allows a user to access the portion of the vehicle that is blocked by the load-bearing system when in the locked position.

There are limited options for load-bearing cargo systems for vehicles. There are fixed load-bearing cargo carriers, which attach to the rear end of a vehicle. However, this type of cargo carrier blocks access to the rear end of the vehicle when it is loaded, therefore providing a hassle to the user when accessing the vehicle. As disclosed in U.S. Pat. No. 6,701,913 and U.S. Patent Application Publication 2012/0305612, there exist moving load-bearing cargo carriers that attach to the rear of a vehicle and rotate away from the vehicle in order to provide a user with access to the rear of the vehicle.

However, these cargo carriers are limited in certain applications because the swinging arm in each device has a significant restriction on load-bearing capacity, and therefore cannot accommodate heavy loads such as a motorcycle rack or other bulky items. A further restriction on existing moving load-bearing carriers is that the locking systems in these assemblies do not lift the carrying load off of the swing arms in the locked position, which weakens the system and promotes premature wear and tear of its components. Each existing moving cargo carrier is also limited because it lacks the stability necessary to accommodate heavy loads during all portions of the device's swing path.

As such, there is a need for a stable and durable load-bearing system that will carry a heavy load and which provides a user access to the rear of a vehicle. There is a further need for a load-bearing system that has a positive locking system that will accommodate an increased load safely and effectively.

SUMMARY

A load-bearing system configured to rotatably support heavy cargo loads supported from a vehicle is provided. The system is configured for attachment to a frame of the vehicle. The system comprises a pivot platform coupled to the frame of the vehicle and comprising first and second swing arms pivotably mounted to the pivot platform, each swing arm in the first and second swing arms comprising a first end coupled to the pivot platform and a second end coupled to a mounting platform, the mounting platform rotatably mounted to the second ends of the first and second swing arms, the mounting platform configured to permit attachment thereto of one or more cargo carriers that are configured to support cargo thereon or therein, and a locking assembly coupled to the frame of the vehicle and comprising a lever pivotably mounted to a plurality of linkage arms, the locking assembly configured to detachably couple to the mounting platform, wherein the lever of the locking assembly pivotably adjusts to a first position to lock the mounting platform into a first position against the vehicle, wherein the lever of the locking assembly pivotably adjusts to a second position to unlock the mounting platform and permit rotation of the mounting platform away from the vehicle so as to expose the portion of the vehicle blocked by the mounting platform when in the first position.

BRIEF DESCRIPTION OF THE FIGURES

The detailed description of some embodiments of the invention will be made below with reference to the accompanying figures, wherein the figures disclose one or more embodiments of the present invention.

FIG. 5 depicts a front view of certain embodiments of the load-bearing system illustrating the locking assembly in the locked position;

FIG. 6 depicts a section view of certain embodiments of the load-bearing system taken along line 6-6 in FIG. 5;

FIG. 7 depicts a front view of certain embodiments of the load-bearing system illustrating the locking assembly in the unlocked position;

FIG. 8 depicts a section view of certain embodiments of the load-bearing system taken along line 8-8 in FIG. 7;

FIG. 9 depicts a section view of certain embodiments of the load-bearing system;

DETAILED DESCRIPTION OF CERTAIN EMBODIMENTS

Figure 1:
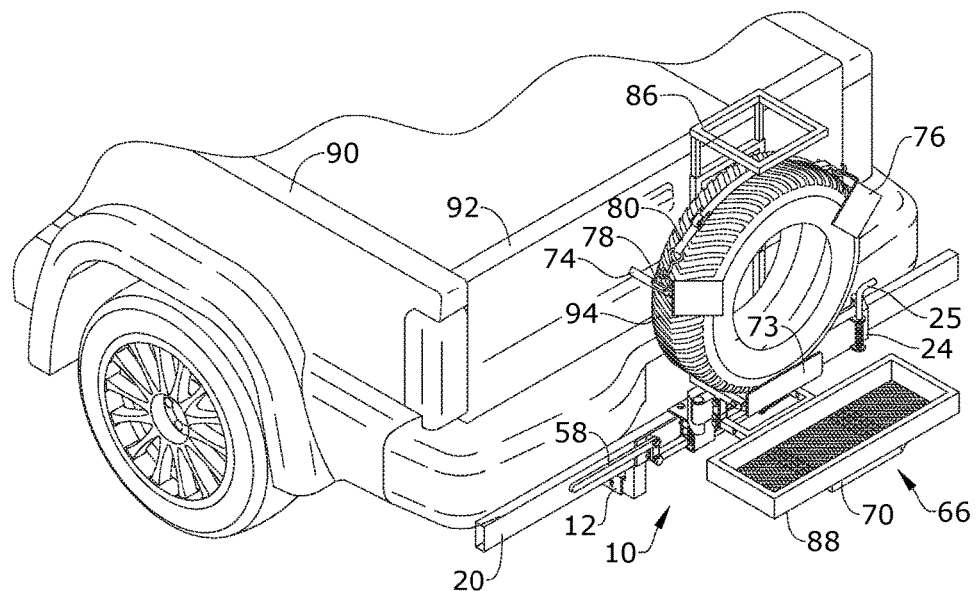
FIG. 1 depicts a perspective view of certain embodiments of the load-bearing system shown in use in a locked position against a vehicle.
Figure 2:
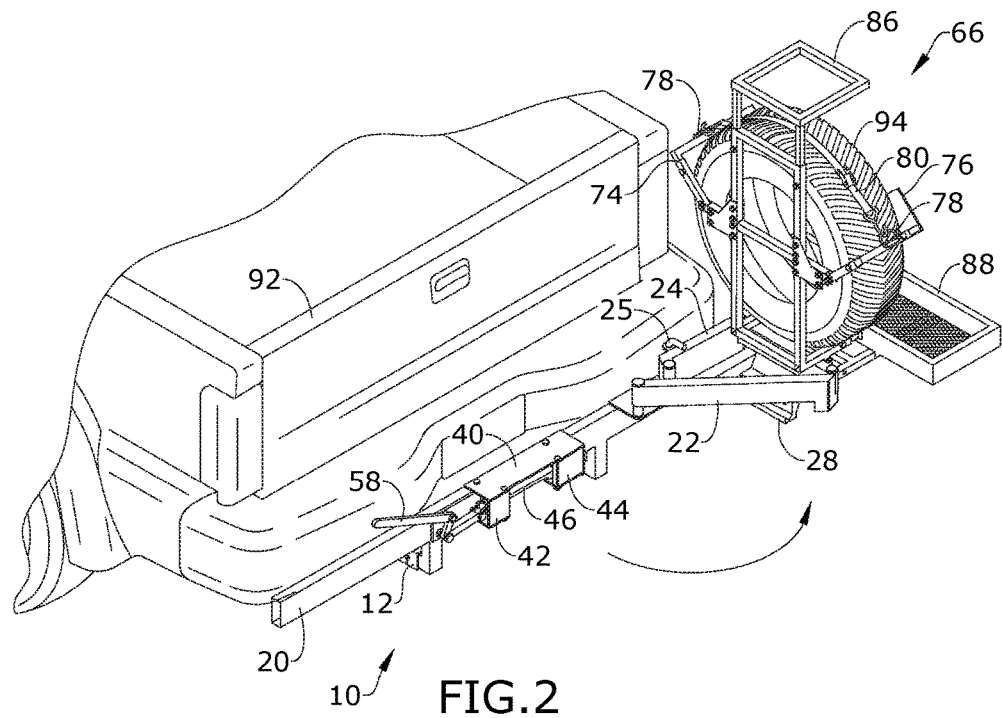
FIG. 2 depicts a perspective view of certain embodiments of the load-bearing system shown in use in an unlocked position and rotated away from the vehicle.

As depicted in FIGS. 1-2, load-bearing system 10 is coupled to vehicle 90 to support cargo loads on cargo carrier assembly 66 and/or cargo carrier tray 88 in certain embodiments of the invention. Load-bearing system 10 is configured to support an enhanced load and comprises a locking mechanism to retain the supported loads in the locked position. Cargo carrier assembly 66 and cargo carrier tray 88 are configured to support tire 94, machinery, bulky items and other accessories.

As depicted in FIG. 1, load-bearing system 10 is illustrated in the locked closed position against vehicle 90. As depicted in FIG. 2, load-bearing system 10 is illustrated in the unlocked open position rotated away from the rear of vehicle 90. Although certain embodiments of the invention depict vehicle 90 as a truck with tailgate 92, it shall be appreciated that load-bearing system 10 can be mounted to alternative vehicles including, but not limited to, other types of trucks, trailers, automobiles or vehicles.

In a preferred embodiment, the components of load-bearing system 10 are preferably made from steel, other metals or materials. As depicted in FIGS. 1-5, load-bearing system 10 generally comprises a dual-swing arm assembly comprising long swing arm 22, short swing arm 24, mounting platform 29 and pivot platform 34, and a locking assembly comprising a plurality of linkage arms comprising lever 58, connecting linkage arm 56 and pivoting linkage arms 46.

Load-bearing system 10 can be coupled to vehicle 90 in a variety of configurations. In one embodiment, the dual-swing arm assembly and locking assembly are coupled to support bar 20, which comprises attachment arms 14 coupled thereto. Attachment arms 14 are slidably mounted to receiver sleeves 12 by hitch pins 16 and cotter pins 18. Receiver sleeves 12 are directly attached to the framework of vehicle 90 or the existing receiver mount of vehicle 90 using mechanical fasteners. In an alternative embodiment, the dual-swing arm assembly and locking assembly can be directly attached to an aftermarket bumper of vehicle 90 using mechanical fasteners. In an alternative embodiment, the dual-swing arm assembly and locking assembly are directly attached to a single receiver sleeve of vehicle 90.

Figure 4:
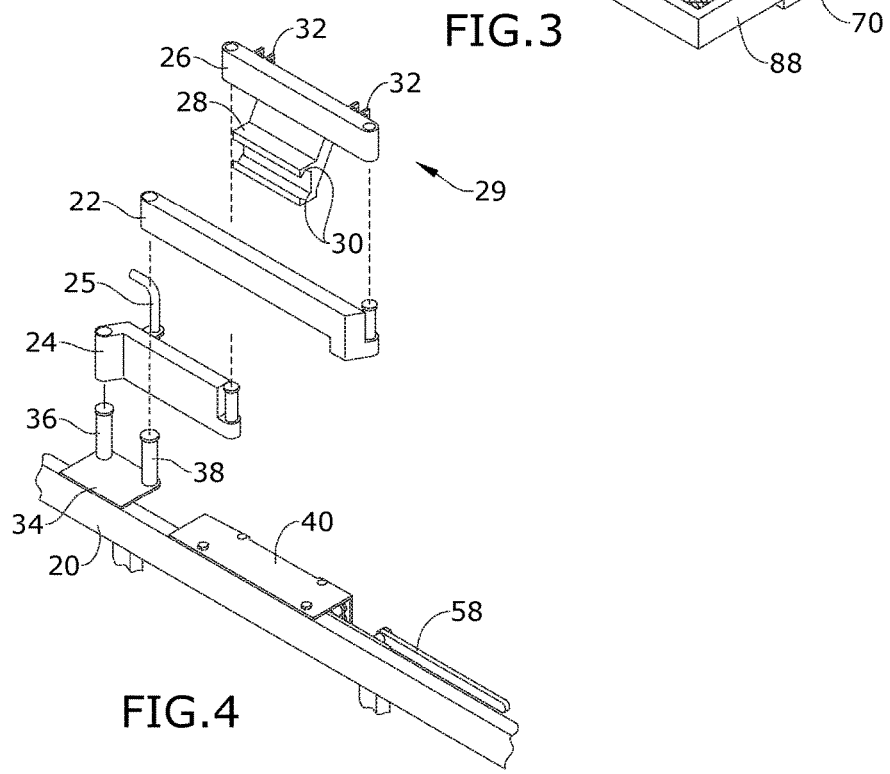
FIG. 4 depicts a rear exploded view of certain embodiments of the load-bearing system.

In certain embodiments, pivot platform 34 is welded or mechanically fastened to support bar 20 as depicted in FIG. 4. First and second spindles 36, 38 are coupled to pivot platform 34. Short swing arm 24 and long swing arm 22 are pivotably mounted to pivot platform 34 by first spindle 36 and second spindle 38. Specifically, the first end of short swing arm 24 comprises an opening that receives first spindle 36 and the first end of long swing arm 22 comprises an opening that receives second spindle 38. In an alternative embodiment, long and short swing arms 22, 24 can be mounted to pivot platform 34 using any combination of components including, but not limited to, barrel hinges, bearings, washers, locking nuts, caps, locking pins or other components capable of facilitating the pivotal movement of long and short swing arms 22, 24 on pivot platform 34.

Figure 10:
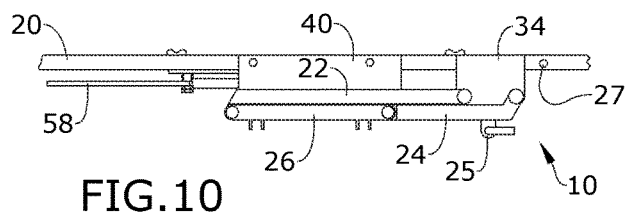
FIG. 10 depicts a top view of certain embodiments of the load-bearing system in the locked position against the vehicle.
Figure 11:
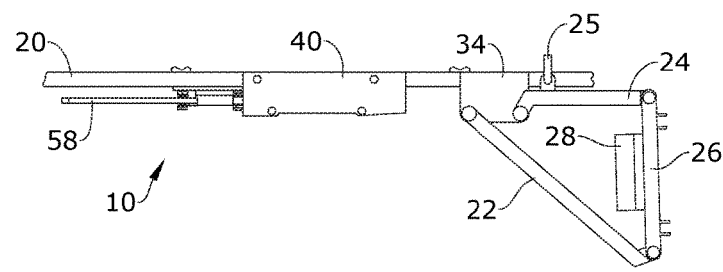
FIG. 11 depicts a top view of certain embodiments of the load-bearing system in an unlocked position and rotated away from the vehicle.

Mounting platform 29 is rotatably mounted to the second ends of long and short swing arms 22, 24. In one embodiment, the second ends of long and short swing arms 22, 24 comprise spindles that insert within a pair of openings in mounting platform 29. Mounting platform 29 can be rotatably mounted to long and short swing arms 22, 24 using bearings or alternative components. In one embodiment, short swing arm 24 comprises spring-loaded bolt 25, which is configured to detachably couple to opening 27 in support bar 20 as depicted in FIGS. 10-11.

Figure 3:
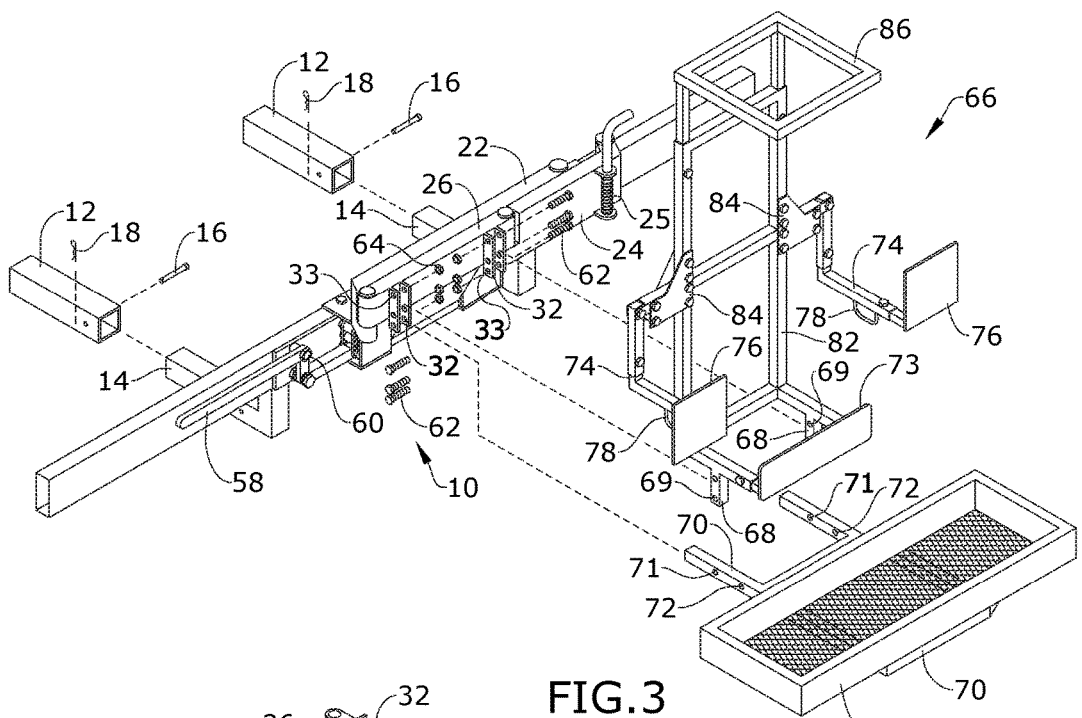
FIG. 3 depicts an exploded view of certain embodiments of the load-bearing system.

As depicted in FIGS. 3-4, mounting platform 29 comprises upper mounting arm 26 continuously connected to lower latch member 28. Upper mounting arm 26 comprises a plurality of attachment tabs 32 with openings 33 designed to permit the attachment of cargo carrier assembly 66 and cargo carrier tray 88 thereto using mechanical fasteners. Lower latch member 28 comprises a generally C-shaped member with interior notches 30.

As depicted in FIGS. 3-8, the locking assembly is coupled to support bar 20 in certain embodiments. In one embodiment, the plurality of linkage arms comprises lever 58, connecting linkage arm 56 and pivoting linkage arms 46 adjustably mounted relative to each other and coupled to support bar 20. Lever 58 is pivotably mounted to support bar 20 at pivot point 60 using a pivot component. Connecting linkage arm 56 connects lever 58 to upper and lower pivoting linkage arms 46. More specifically, connecting linkage arm 56 comprises a first end coupled to lever 58 by one or more mechanical fasteners and a second end coupled to first pivot plate 52 using one or more mechanical fasteners as depicted in FIGS. 5 and 7. First and second pivot plates 52 are rotatably mounted to support bar 20 by pivot rods 54. Upper and lower pivoting linkage arms 46 are rotatably mounted to first and second pivot plates 52 by mechanical fasteners. Each pivoting linkage arm 46 comprises peak portion 48. In one embodiment, locking assembly housing 40, first housing plate 42 and second housing plate 44 are coupled together using mechanical fasteners to cover certain portions of the locking assembly as depicted in FIGS. 2 and 4.

The locking assembly is configured to engage with mounting platform 29 in the locked position against vehicle 90 as depicted in FIG. 1 or disengage with mounting platform 29 to permit the dual-swing arm assembly to swing to the open and unlocked position away from vehicle 90 as depicted in FIG. 2. As depicted in FIGS. 10-11, spring-loaded bolt 25 on short swing arm 24 is configured to detachably couple to opening 27 in support bar 20 to secure the dual-swing arm assembly in the open position.

As depicted in FIGS. 1, 5-6 and 10, lever 58 in the first position engages the locking assembly with mounting platform 29 of the dual-swing arm assembly in the locked position. Lever 58 in the first position maneuvers connecting linkage arm 56 to increase the space between upper and lower pivoting linkage arms 46 so that peak portions 48 of upper and lower pivoting linkage arms 46 are nestled within notches 30 of mounting platform 29. This prevents upper and lower pivoting linkage arms 46 from swinging out the side opening in the generally C-shaped lower latch member 28, thereby locking the dual-swing arm assembly against vehicle 90.

As depicted in FIGS. 2, 7-8 and 11, lever 58 in the second position disengages the locking assembly from mounting platform 29 of the dual-swing arm assembly to the unlocked position. Lever 58 in the second position maneuvers connecting linkage arm 56 to decrease the space between upper and lower pivoting linkage arms 46. In this compressed configuration, peak portions 48 of upper and lower pivoting linkage arms 46 are directed away from notches 30 of mounting platform 29. This permits upper and lower pivoting linkage arms 46 to swing out the side opening in the generally C-shaped lower latch member 28, thereby permitting the dual-swing arm assembly to rotate away from vehicle 90 as depicted in FIG. 2.

As such, pivotal movement of lever 58 between the first and second positions increases and decreases the separation distance between upper and lower pivoting linkage arms 46 as needed to permit the locking, unlocking and swinging of the dual-swing arm assembly as desired. As depicted in FIG. 5, locking assembly notches 50 help to achieve maximum contractions of peak portions 48 of upper and lower pivoting linkage arms 46, thereby permitting easier opening and closing operations. In one embodiment, spacers are coupled to the locking assembly in front and behind upper and lower pivoting linkage arms 46 to prevent upper and lower pivoting linkage arms 46 from tilting out of place as lever 58 is pivotably adjusted between the first and second positions.

Figure 12:
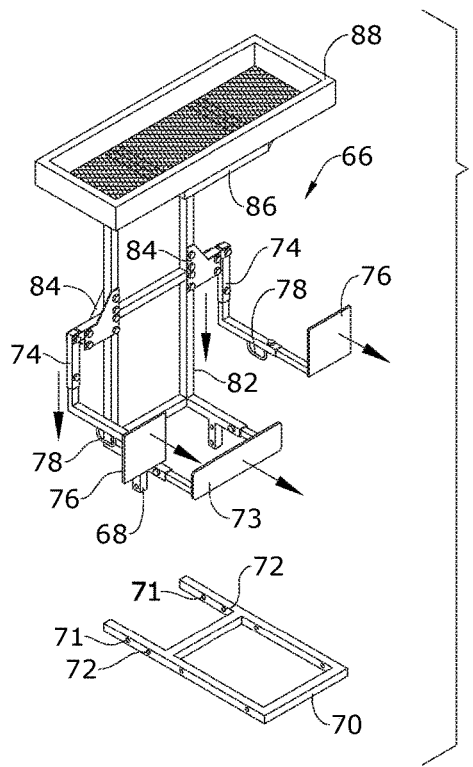
FIG. 12 depicts a perspective view of certain embodiments of the load-bearing system illustrating cargo carrier assembly 66.
Figure 13:
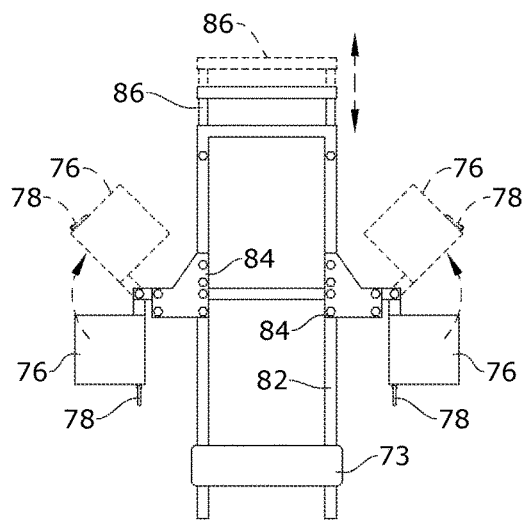
FIG. 13 depicts a front view of certain embodiments of the load-bearing system illustrating the adjustment of cargo carrier assembly 66.

Cargo carrier assembly 66 and cargo carrier tray 88 are coupled to mounting platform 29 of the dual-swing arm assembly as needed. As depicted in FIGS. 3 and 12-13, cargo carrier assembly 66 comprises a frame assembly comprising a plurality of arms and/or tubular members coupled together by mechanical fasteners. In one embodiment, the frame assembly comprises lower arm assembly 82, upper arm assembly 86 and side telescoping arm assemblies 74.

Upper arm assembly 86 is slidably mounted to the interior of lower arm assembly 82 in one of a plurality of locking positions. The pair of side telescoping arm assemblies 74 is pivotably mounted to lower arm assembly 82 by connection plates 84 and mechanical fasteners. Each side telescoping arm assembly 74 can pivot relative to lower arm assembly 82 and slidably adjust to lengthen or shorten as needed. In one embodiment, each side telescoping arm assembly 74 comprises side arm securement plate 76 at the end. In one embodiment, lower arm securement plate 73 is slidably mounted to the lower portion of lower arm assembly 82 in one of a plurality of locking positions. It shall be appreciated that the respective arm members of lower arm assembly 82, upper arm assembly 86 and side telescoping arm assemblies 74 can be adjusted to different height and width adjustments and locked in place in desired positions using standard locking pin and arm opening-type connections.

In one embodiment, attachment arms 68 are coupled to the bottom of lower arm assembly 82. As depicted in FIG. 3, attachment arms 68 comprise openings 69 that are aligned with openings 33 in attachment tabs 32 on mounting platform 29 of the dual-swing arm assembly. Mechanical fasteners such as bolts 62 are inserted through openings 33 in attachment tabs 32 and openings 69 in attachment arms 68, and coupled to nuts 64. This mounts cargo carrier assembly 66 to mounting platform 29 of the dual swing arm assembly. As depicted in FIGS. 1-2 and 12-13, lower arm assembly 82, upper arm assembly 86 and side telescoping arm assemblies 74 are configured to adjust to accommodate tire 94 with side arm securement plates 76 and lower arm securement plate 73 extending around the side of tire 94. In one embodiment, cargo carrier assembly 66 comprises tie-down loops 78 configured to receive ratchet strap 80. Ratchet strap 80 is connected to tie-down loops 78 and tightened around tire 94 as desired.

As depicted in FIG. 12, cargo carrier tray 88 can be coupled to cargo carrier assembly 66 in one embodiment. Cargo carrier tray 88 is configured to support any items, equipment, tools, accessories and the like. Any combination of mechanical fasteners, straps, clips and the like can be used to secure cargo carrier tray 88 to the top of upper arm assembly 86.

In an alternative embodiment, cargo carrier tray 88 is coupled to mounting platform 29 of the dual-swing arm assembly using accessory frame 70. Accessory frame 70 comprises a plurality of arms connected together with first attachment openings 71 and second attachment openings 72. As depicted in FIGS. 1-3, mechanical fasteners such as bolts 62 are inserted through openings 33 in attachment tabs 32 and first attachment openings 71 in accessory frame 70, and coupled to nuts 64. This secures accessory frame 70 to mounting platform 29 of the dual-swing arm assembly. Cargo carrier tray 88 is coupled to accessory frame 70 using any combination of mechanical fasteners, straps, clips, brackets and the like. In the event cargo accessory assembly 66 is detached from the dual-swing arm assembly, accessory frame 70 can be pivotably adjusted to the vertical storage position and locked in place by inserting additional bolts 62 through openings 33 in attachment tabs 32 and second attachment openings 72 in accessory frame 70.

It shall be appreciated that the components of load-bearing system 10 described in several embodiments herein may comprise any alternative known materials in the field and be of any color, size and/or dimensions. It shall be appreciated that the components of load-bearing system 10 described herein may be manufactured and assembled using any known techniques in the field. In alternative embodiments, a variety of attachments can be coupled to mounting platform 29 including, but not limited to, cargo racks, motorcycle carriers, scooter carriers and the like.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A load-bearing system configured to rotatably support heavy cargo loads supported from a vehicle, the system configured for attachment to a frame of the vehicle, the system comprising:
   a pivot platform coupled to the frame of the vehicle and comprising first and second swing arms pivotably mounted to the pivot platform, each swing arm in the first and second swing arms comprising a first end coupled to the pivot platform and a second end coupled to a mounting platform, the mounting platform rotatably mounted to the second ends of the first and second swing arms, the mounting platform configured to permit attachment thereto of one or more cargo carriers that are configured to support cargo thereon or therein; and
   a locking assembly coupled to the frame of the vehicle and comprising a lever pivotably mounted to a plurality of linkage arms, the locking assembly configured to detachably couple to the mounting platform;
   wherein the lever of the locking assembly pivotably adjusts to a first position to lock the mounting platform into a first position against the vehicle, wherein the lever of the locking assembly pivotably adjusts to a second position to unlock the mounting platform and permit rotation of the mounting platform away from the vehicle so as to expose the portion of the vehicle blocked by the mounting platform when in the first position.

2. The load-bearing system of claim 1, wherein the first swing arm comprises a first length and the second swing arm comprises a second length, wherein the second length is greater than the first length.

3. The load-bearing system of claim 2, wherein the mounting platform comprises an upper mounting arm rotatably mounted to the second ends of the first and second swing arms and a lower latch member continuously connected to the upper mounting arm, the lower latch member comprising a notch in communication with a portion of the plurality of linkage arms of the locking assembly.

4. The load-bearing system of claim 3, wherein the plurality of linkage arms of the locking assembly comprises a connecting linkage arm coupled to the lever, an upper lock linkage arm rotatably mounted to the connecting linkage arm and a lower lock linkage arm rotatably mounted to the connecting linkage arm, wherein pivotal movement of the lever to the first position increases separation distance between the upper and lower lock linkage arms and pivotal movement of the lever to the second position decreases the separation distance between the upper and lower lock linkage arms.

5. The load-bearing system of claim 4, wherein the lever in the first position permits the upper and lower lock linkage arms to be nestled within spacing of the notch in the lower latch member to lock the mounting platform in the first position against the vehicle, wherein the lever in the second position permits the upper and lower lock linkage arms to slide out the notch of the lower latch member during rotation of the mounting platform away from the vehicle.

6. The load-bearing system of claim 5, wherein the upper mounting arm of the mounting platform comprises a plurality of attachment tabs.

7. The load-bearing system of claim 6, wherein the one or more of the cargo carriers comprises a first cargo carrier coupled to the attachment tabs of the mounting platform, the first cargo carrier comprising a frame assembly comprising an upper tubular arm assembly slidably mounted to a lower tubular arm assembly, and a pair of side arm assemblies pivotably mounted to the lower tubular arm assembly, wherein the upper tubular arm assembly slidably adjusts relative to the lower tubular arm assembly and the pair of side arm assemblies pivotably adjusts relative to the lower tubular arm assembly to permit the first cargo carrier to secure any portion of the cargo therein within the upper tubular arm assembly, lower tubular arm assembly and pair of side arm assemblies.

8. The load-bearing system of claim 7, wherein each pair of side arm assemblies in the pair of side arm assemblies comprises a telescoping arm assembly with a side arm securement plate, the telescoping arm assembly configured to adjust to permit the side arm securement plate to contact the any portion of the cargo.

9. The load-bearing system of claim 8, further comprising a lower arm securement plate slidably adjusted to the lower tubular arm assembly and configured to contact the any portion of the cargo.

10. The load-bearing system of claim 9, wherein the one or more of the cargo carriers comprises a second cargo carrier coupled to the attachment tabs of the mounting platform, the second cargo carrier comprising a tray configured to support any portion of the cargo.

\* \* \* \* \*